United States Patent
Schmidt

(10) Patent No.: US 6,729,649 B1
(45) Date of Patent: May 4, 2004

(54) SAFETY BELT SYSTEM WITH A PRETENSIONING DEVICE AND AP FORCE LIMITER

(75) Inventor: Thomas Schmidt, Timmendorfer Strand (DE)

(73) Assignee: Autoliv Development AB (SE)

( * ) Notice: Subject to any disclaimer, the term of this patent is extended or adjusted under 35 U.S.C. 154(b) by 0 days.

(21) Appl. No.: 09/831,963

(22) PCT Filed: Nov. 4, 1999

(86) PCT No.: PCT/EP99/08457

§ 371 (c)(1),
(2), (4) Date: Sep. 17, 2001

(87) PCT Pub. No.: WO00/29265

PCT Pub. Date: May 25, 2000

(30) Foreign Application Priority Data

Nov. 13, 1998 (DE) .......................................... 198 52 377

(51) Int. Cl.[7] .............................................. B60R 22/28
(52) U.S. Cl. ....................................... 280/805; 280/806
(58) Field of Search ............................. 280/801.1, 805, 280/806; 180/268; 297/480; 242/374

(56) References Cited

U.S. PATENT DOCUMENTS

| | | |
|---|---|---|
| 3,918,545 A | 11/1975 | Andres et al. |
| 5,364,129 A | 11/1994 | Collins et al. |
| 5,413,378 A | 5/1995 | Steffens, Jr. et al. |
| 5,707,078 A | 1/1998 | Swanberg et al. |
| 5,947,514 A | 9/1999 | Keller et al. |

FOREIGN PATENT DOCUMENTS

| | | |
|---|---|---|
| DE | OS 1913448 | 9/1970 |
| DE | 43 31027 A1 | 3/1995 |
| WO | WO 90/11913 | 10/1990 |
| WO | WO 95/27638 | 10/1995 |

*Primary Examiner*—Paul N. Dickson
*Assistant Examiner*—Deanna Draper
(74) *Attorney, Agent, or Firm*—R W Becker & Associates; R W Becker

(57) ABSTRACT

A safety belt arrangement includes a controllable blocking apparatus that is controlled sensitive to the vehicle and/or to the safety belt. A safety belt buckle is provided and a tensioning apparatus is inserted in the safety belt arrangement, such that the tensioning apparatus, when triggered, eliminates the slack in the belt. The arrangement also includes a continuously working device for limiting the force exerted on the safety belt by the forward displacement of the belted occupant.

16 Claims, 2 Drawing Sheets

SAFETY BELT SYSTEM WITH A PRETENSIONING DEVICE AND AP FORCE LIMITER

BACKGROUND OF THE INVENTION

The present invention relates to a safety belt arrangement with a controllable blocking apparatus that is controlled sensitive to the vehicle and/or to the safety belt, and with a safety belt buckle and with a tensioning apparatus inserted in the safety belt arrangement, which tensioning apparatus when triggered eliminates the slack in the belt, and with a continuously working device for limiting the force exerted on the safety belt by the forward displacement of the belted occupant.

Prior art includes a retractor described in DE-OS 19 13 448 as a blocking apparatus with a tensioning apparatus associated with the retractor; in the known device, during normal driving the belt shaft is associated with a lockable tensioning spring as tensioning apparatus that is triggered when a predetermined dangerous vehicle deceleration occurs, whereby the end of the tensioning spring associated with the belt shaft engages the belt shaft by means of a tension coupling that is triggerable during dangerous situations so that the tensioning spring causes the slack in the safety belt to be taken up on the belt shaft in the tensioning direction.

Once the tensioning procedure has concluded, there is a blocking condition in which substantial forces can disadvantageously occur when the body of the occupant belted in can "fall into the belt" due to the acceleration or deceleration forces exerted on him so that retention by means of the safety belt entails a risk of injury. For avoiding this, the safety belt retractor known from DE-OS 19 13 448 is provided a continuously functioning force limiting device that, during the load on the safety belt that occurs subsequent to the tensioning motion, permits a limited belt release by rotating the belt shaft in the unwinding direction of the safety belt.

The known embodiment of the safety belt arrangement is associated with the disadvantage that when the tensioning process and the force limiting process overlap, as can occur during a serious accident when the safety belt is somewhat slack, the force limiting device can be triggered during the tensioning process and thus the established preliminary displacement path of the force limiting device can be used up and thus the winding path of the tensioning apparatus can be made to compensate. That is, if there is already a high load on the safety belt in the unwinding direction by a premature displacement of the belted occupant during the tensioning process effective in the winding direction of the safety belt, such a high load can build up in the safety belt that the force limiting device becomes operative and a corresponding belt release is permitted at the same time as the belt retraction initiated by the tensioning apparatus.

The object of the present invention is therefore to avoid an overlap in the tensioning process and the force limiting process in a safety belt arrangement of the type cited in the foregoing.

SUMMARY OF THE INVENTION

This object is achieved, including advantageous embodiments and further developments of the present invention, from the contents of the patent claims that follow this specification.

The main idea behind the invention is to provide a time-controlled device for actively turning off the drive of the tensioning apparatus after a predetermined time period has elapsed.

Known from DE 43 31 027 A1 is a safety belt arrangement with a retractor, a tensioning apparatus coupled thereto, and a force limiting device, in which safety belt arrangement suitable means ensure that the force limiting device does not function until the tensioning motion has concluded, whereby the force limiting device is turned off during normal blocking of the self-blocking retractor and does not become ready to function until there is a tensioning motion. This ensures that during an accident that does not trigger activation of the tensioning apparatus, the force limiting device is not switched on and therefore is not functional, because in such cases even limited preliminary displacement of the occupant is not permitted. Such preliminary displacement is only permissible when the belt lies taut against the body, which means that the force limiting device does not switch on until after the tensioning motion has concluded. Although overlap of the tensioning process and force limiting process is prevented in such a safety belt arrangement, this requires that a coupling between the retractor and the force limiting device be turned on, and not only is this complex in terms of manufacture and assembly, it also entails the disadvantage of a malfunction in such a provided coupling.

Thus the present invention advantageously focuses on preventing the tensioning process and the force limiting process from overlapping in a continuously functioning force limiting device. In addition, the present invention is not limited to the cooperation of a tensioning apparatus with a retractor, but rather can be employed with any type of tensioning apparatus, for instance even with a lock tensioner, and with any type of force limiting device, that is, for instance, with a force limiting device that can be inserted in the safety belt itself if the drive of the tensioning apparatus is rendered non-functional after a predetermined period of time. Thus the drive of the tensioning apparatus is turned off early enough that the force critical for triggering the force limiting device cannot build up in the safety belt arrangement even if there is a possible early preliminary displacement of the belted occupant during the tensioning process.

In accordance with one exemplary embodiment of the present invention, it is provided that the time measurement for the predetermined period of time is activated by a central sensor, known per se, for controlling the components in the safety belt arrangement, as such a central sensor is used for triggering the airbag arranged in a vehicle or for triggering tensioning apparatus; thus the drive of the tensioning apparatus is deactivated independent of all of the parameters for tensioning the belt, such as ignition time for the drive, tensioning path, belt slack, tensioning force, after a predetermined time period of about 6 to 12 milliseconds, so that during the period of the accident event subsequent thereto the force limiting device can begin to function with no interference. This means that the focus is on the beginning of the accident event determined by the central sensor of the vehicle, and this is particularly advantageous when the force level of the force limiting device is set low.

In accordance with one exemplary embodiment of the present invention, it can be provided that the time measurement for the predetermined time period is activated by triggering the tensioning apparatus—for instance by the gas pressure that occurs or by the movement of corresponding drive means.

In one embodiment, the invention provides that the predetermined time period for turning off the drive in the tensioning apparatus is variably adjustable. Thus, in accordance with one exemplary embodiment of the invention, the setting of the predetermined time period depending on the deformation characteristics of the type of vehicle during an accident can be one influencing variable for the setting of the predetermined time period. It is also possible to modify or adapt the setting of the predetermined time period during the accident event depending on the detected accident conditions such as, for instance, the severity of the accident or the seated distance from the steering wheel or dashboard as other parameters.

Once the predetermined time period for deactivation has elapsed, in accordance with one exemplary embodiment of the present invention, the drive for the tensioning apparatus can be turned off via a sudden release of the drive. To this end it can be provided that the pipe that conducts the propellant gases generated by the drive for the tensioning apparatus has a relief aperture that is closed off via a valve that can be opened after the predetermined time period has elapsed. In accordance with exemplary embodiments of the present invention, the valve can comprise a stopper comprising pyrotechnic material, which stopper has a burn-out duration that equals the predetermined time period for turning off the drive for the tensioning apparatus, or it can be provided that the valve comprises a valve cover that closes off the relief aperture in the pipe, whereby the valve cover can be removed from the relief aperture by an external force.

In one alternative embodiment of the present invention, it can be provided that a sudden interruption in the flux of force between the drive for the tensioning apparatus to the part in the safety belt arrangement that tautens the belt turns off the drive for the tensioning apparatus.

When, in accordance with one exemplary embodiment of the present invention, the tensioning apparatus can be coupled to the belt shaft of the blocking apparatus by means of a pawl coupling, as described in DE 43 31 027 A1, it can be provided that the coupling provided between the shaft and the tensioning apparatus can be made to engage the associated counterpart by means of an actuator and can be returned to an unengaged position once the predetermined time period has elapsed.

In one embodiment of a safety belt arrangement in which the tensioning apparatus acts by means of mass bodies accelerated by the drive of the tensioning apparatus on a pinion arranged on the belt shaft of the blocking apparatus, as disclosed in WO 95/27638 for instance, it can be provided that the belt shaft and pinion are mutually engaged by at least one catch, and that after the predetermined time period has elapsed the catch can be disengaged from the pinion via an associated actuator.

When, in accordance with exemplary embodiments of the present invention, it is provided that the valve cover moves or that there is an interruption in the flux of force from the drive for the tensioning apparatus to the part that performs the belt tensioning, in accordance with alternative exemplary embodiments of the invention, the external force to be additionally applied can be applied mechanically, electrically, or pyrotechnically using suitable drive elements, whereby these drive elements can be rendered functional by a time control.

BRIEF DESCRIPTION OF THE DRAWINGS

The drawings illustrate exemplary embodiments of the invention that are described hereinafter, in which.

DESCRIPTION OF THE PREFERRED EMBODIMENTS

The drawings are merely exemplary illustrations of the invention with regard to constructive elements in a safety belt arrangement; see the disclosure in DE 43 31 027 A1 and WO 95/27638, cited in the foregoing, for how these constructive elements cooperate with the other parts in a safety belt arrangement.

Figure 1:
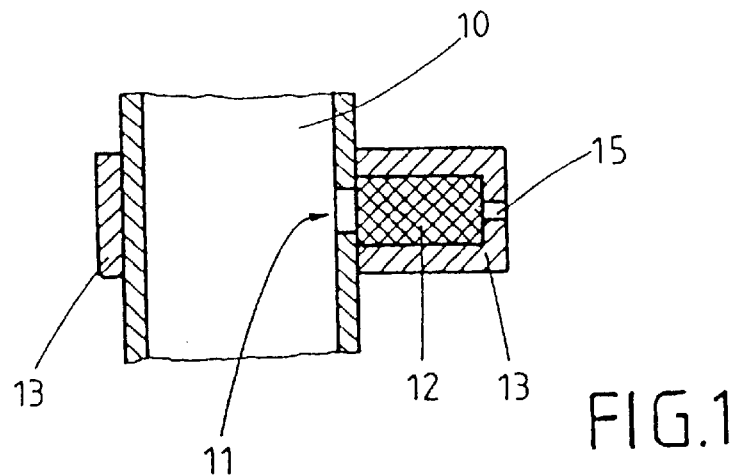
FIG. 1 is a schematic view of the component of the drive in a tensioning apparatus with a device for turning it off.

When in FIG. 1 a pipe 10 is a component of a pyrotechnic drive for a tensioning apparatus, for turning off the drive this pipe 10 has a relief aperture 11 that permits the sudden release of the drive energy and that is closed off for the tensioning process by means of a stopper 12, which itself is held in a pipe clamp 13 forming a housing for receiving the stopper 12. The pipe clamp 13 also has an outlet aperture 15. The stopper 12 comprises a pyrotechnic material and is designed such that its burn-out time corresponds to the predetermined time period for which the tensioning apparatus is to be functional. When the tensioning apparatus is triggered, the hot gases flowing in the pipe 10 travel through the relief aperture 11 and act on the stopper 12 comprising pyrotechnic material and ignite it so that the stopper 12 burns up. Once this burning has concluded, the relief aperture 11 is unblocked so that the drive gases that continue to flow via the relief aperture 11 and the outlet aperture 15 in the pipe clamp 13 are diverted and thus are no longer available for conveying the drive energy to the tensioning apparatus.

Figure 2:
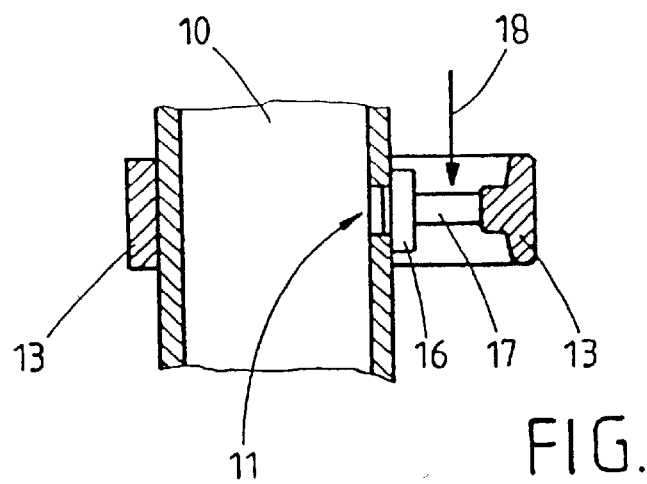
FIG. 2 is another embodiment of the subject of FIG. 1.

FIG. 2 illustrates another exemplary embodiment in which a valve cover 16 closes off the relief aperture 11 and is held against the pipe clamp 13 by a retaining rod 17. When a force is exerted externally in the direction of the arrow 18 on the retaining rod 17, the valve cover 16 is removed from the relief aperture 11 and exposes it so that the drive gases can be released from the pipe 10. The force to be applied externally can be exerted mechanically, electrically, or pyrotechnically, whereby appropriately actuated suitable drive elements are rendered functional by a time control (not shown in detail) in terms of limiting the function time of the tensioning apparatus. Thus, for instance, a pyrotechnic element can push away the retaining rod 17, whereby the pyrotechnic element is controlled by the central sensor.

Figure 3:
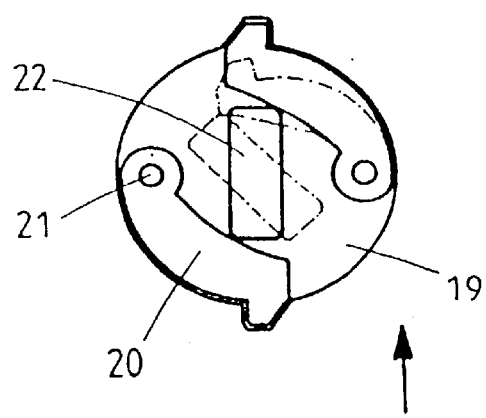
FIG. 3 is a schematic lateral view of a device for turning off the drive in the tensioning apparatus.

FIG. 3 illustrates the basic application of the invention in an embodiment in which a tensioning apparatus embodied, for instance, as a linear tautener with a pulley can be coupled to the shaft 19 of a retractor in which, for instance, catches 20 borne pivotably around an axis 21 on the belt shaft 19 are controllable radially outward until belt shaft 19 and pulley are mutually engaged. The radial outward pivoting movement is effected by an actively controllable actuator 22, which is also used when the tensioning apparatus is to be turned off after a predetermined time period has elapsed.

Also, if, as in WO 95/27683, by means of driven mass bodies 28 the tensioning apparatus works on a pinion 23 connected to the shaft 19 and thereby turns the shaft 19 in the retracting direction, the pinion 23 can be coupled to the shaft 19 by means of correspondingly arranged catches 20 such that for turning off the tensioning apparatus via the actuator 22 the catches 20 are actively disengaged from the pinion 23 so that the tensioning apparatus no longer functions once the predetermined time period has elapsed.

Figure 4:
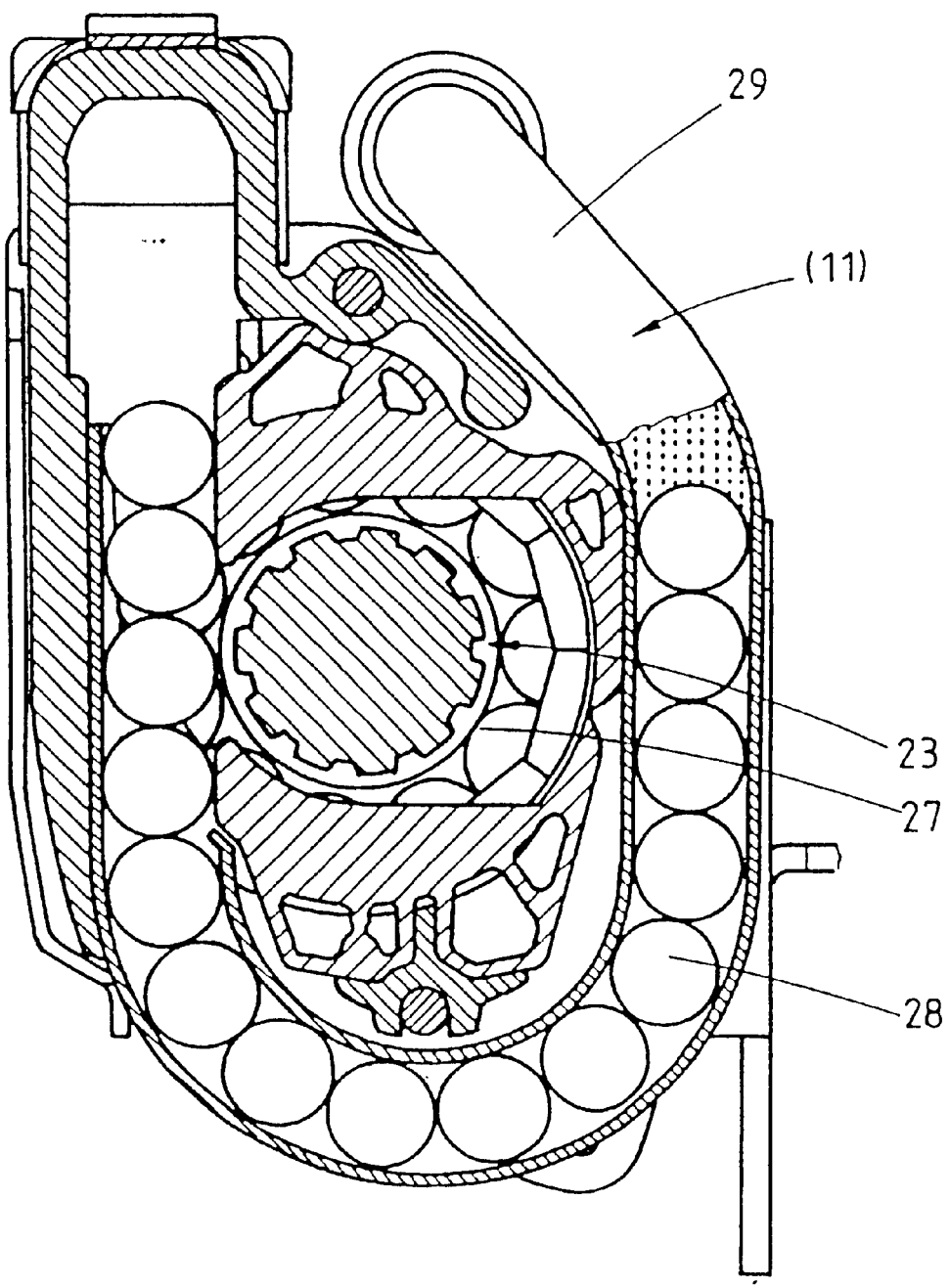
FIG. 4 is a concrete embodiment of the arrangement of a switch-off apparatus in a retractor with tensioning drive.

FIG. 4 illustrates the disclosure in WO 95/27638 with a tensioning apparatus that affects a retractor in which apparatus spheres 28 arranged in a drive pipe 29 are accelerated by appropriately generated propellant gas and engage and drive a pinion 23 connected to the shaft 19. In such an embodiment known from WO 95/27638, the invention can be realized in that the drive pipe 29 is provided with a relief aperture 11 like that of the exemplary embodiments described in FIGS. 1 and 2, which is initially closed off during the time period in which the tensioning motion occurs or in that appropriately controllable catches 20 like those of the exemplary embodiment described for FIG. 3 are arranged in the area of the connection between the shaft 19 and the pinion 23.

The features of the subject of this document that are disclosed in the foregoing specification, in the patent claims, in the abstract, and The specification incorporates by reference the disclosure of German priority documents 198 52 377.7 of Nov. 13, 1998 and PCT/DE99/08457 of Nov. 4, 1999.

The present invention is, of course, in no way restricted to the specific disclosure of the specification and drawings, but also encompasses any modifications within the scope of the appended claims. in the drawing, can be essential, individually or in any combination, to achieving the invention in its various embodiments.

What is claimed is:

1. A safety belt arrangement that includes a controllable blocking device that is sensitive to at least one of a vehicle and a safety belt, a tensioning device that when triggered eliminates slack in said safety belt, and a continuously effective force limiting device for limiting force exerted on said safety belt by forward displacement of a strapped-in occupant, said safety belt arrangement further comprising:

a time-controlled device for actively disengaging a drive of said tensioning device after a predetermined period of time has elapsed since the tensioning device was released after an accident, wherein after disengagement of the drive of the tensioning device, the force limiting device is deployed independently from and successively to deployment of the tensioning device, such that, during a tensioning process of the tensioning device, a forward displacement of a strapped-in occupant does not produce a force in the safety belt arrangement that deploys the force limiting device.

2. A safety belt arrangement according to claim 1, wherein a central sensor is provided for controlling components of said safety belt arrangement, and wherein said central sensor activates a time measurement for said predetermined period of time.

3. A safety belt arrangement according to claim 1, wherein triggering of said tensioning device activates a time measurement for said predetermined period of time.

4. A safety belt arrangement according to claim 1, wherein said predetermined time period for disengaging said tensioning device is variably adjustable.

5. A safety belt arrangement according to claim 4, wherein deformation characteristics of a respective type of vehicle are an influencing variable for setting of said predetermined period of time.

6. A safety belt arrangement according to claim 4, wherein accident conditions determined during an accident are influencing variables for adapting a setting of said predetermined period of time.

7. A safety belt arrangement according to claim 1, wherein said drive of said tensioning device is adapted to be disengaged via a sudden release of drive energy.

8. A safety belt arrangement according to claim 7, wherein said tensioning device is a pyrotechnically driven tensioning device having a pipe for conducting propellant gases generated by said drive of said tensioning device, wherein said pipe has a relief aperture, wherein a valve is provided for closing off said relief aperture, and wherein said valve is adapted to be opened after said predetermined period of time has elapsed.

9. A safety belt arrangement according to claim 8, wherein said valve comprises a stopper of pyrotechnic material, and wherein said stopper has a burn-out duration that corresponds to said predetermined period of time for disengaging said drive of said tensioning device.

10. A safety belt arrangement according to claim 8, wherein said valve comprises a valve cover that closes off said relief aperture of said pipe, and wherein said valve cover is removable from said relief aperture by means of an external force.

11. A safety belt arrangement according to claim 10, which includes means for mechanically, electrically, or pyrotechnically exerting a force for removing said valve cover.

12. A safety belt arrangement according to claim 1, wherein disengagement of said drive of said tensioning device is effected via a sudden interruption in a power flow between said drive of said tensioning device to components that carry out belt tightening within said safety belt arrangement.

13. A safety belt arrangement according to claim 12, wherein said tensioning device is adapted to be coupled to a belt shaft of said blocking device by means of a pawl coupling, and wherein a coupling provided between said belt shaft and said tensioning device is engageable with an associated counterpart by means of an actuator and is disengageable after said predetermined period of time has elapsed.

14. A safety belt arrangement according to claim 13, which includes means for mechanically, electrically, or pyrotechnically exerting a force for acting on said actuator.

15. A safety belt arrangement according to claim 12, wherein said tensioning device, by means of mass bodies accelerated by said drive of said tensioning device, acts upon a pinion disposed on a belt shaft of said blocking apparatus, wherein said belt shaft and said pinion are held in engagement with one another by at least one catch, and wherein said at least one catch is disengageable from said pinion via an actuator after said predetermined period of time has elapsed.

16. A safety belt arrangement according to claim 15, which includes means for mechanically, electrically, or pyrotechnically exerting a force for acting on said actuator.

* * * * *

UNITED STATES PATENT AND TRADEMARK OFFICE
CERTIFICATE OF CORRECTION

PATENT NO. : 6,729,649 B1
DATED : May 4, 2004
INVENTOR(S) : Schmidt

It is certified that error appears in the above-identified patent and that said Letters Patent is hereby corrected as shown below:

Title page,
Item [54], Title should read as follows:
-- [54]  Title:  SAFETY BELT SYSTEM WITH TENSIONING APPARATUS AND FORCE LIMITER --

Signed and Sealed this

Twenty-seventh Day of July, 2004

JON W. DUDAS
*Acting Director of the United States Patent and Trademark Office*